United States Patent [19]
Fiebiger

[11] 3,773,222
[45] Nov. 20, 1973

[54] DOSING INSTALLATION
[75] Inventor: Erich Fiebiger, Siefersheim, Germany
[73] Assignee: Seitz-Werke G.m.b.H., Bad Kreuznach, Germany
[22] Filed: Oct. 10, 1972
[21] Appl. No.: 296,193

[52] U.S. Cl..................... 222/57, 222/76, 222/190, 99/276, 137/3, 137/93, 210/96
[51] Int. Cl.............................................. B67d 5/08
[58] Field of Search .................. 222/55, 56, 57, 76, 222/190; 137/93, 3; 210/96, 103, 142; 99/276

[56] References Cited
UNITED STATES PATENTS
3,605,775   9/1971   Zaander et al.................... 137/93 X
3,307,744   3/1967   Burford............................. 222/57 X FOREIGN PATENTS OR APPLICATIONS
1,268,671   8/1960   France................................ 222/57

*Primary Examiner*—Robert B. Reeves
*Assistant Examiner*—Joseph J. Rolla
*Attorney*—Walter Becker

[57] ABSTRACT

A dosing system for continuously dosing and dispensing the respective quantities of auxiliary filtering substances to be added in connection with a settling filtration to a cloudy liquid, especially beer, for the cooling and yeast sediments, according to which for dispensing an auxiliary filtering substance for the cooling sediments as well as an auxiliary filtering for the yeast sediment there is provided one dosing device each equipped with a flow meter while both devices which are directly connected to the cloudy liquid conveying conduit are preceded by a flow meter and a device for measuring the total cloudiness of the liquid and by a measuring device provided with a heating zone for measuring the yeast sediment in the cloudy liquid conveying conduit. The dosing installation includes a control device for controlling the dosing devices in conformity with the cloudiness measured by the respective devices.

3 Claims, 1 Drawing Figure

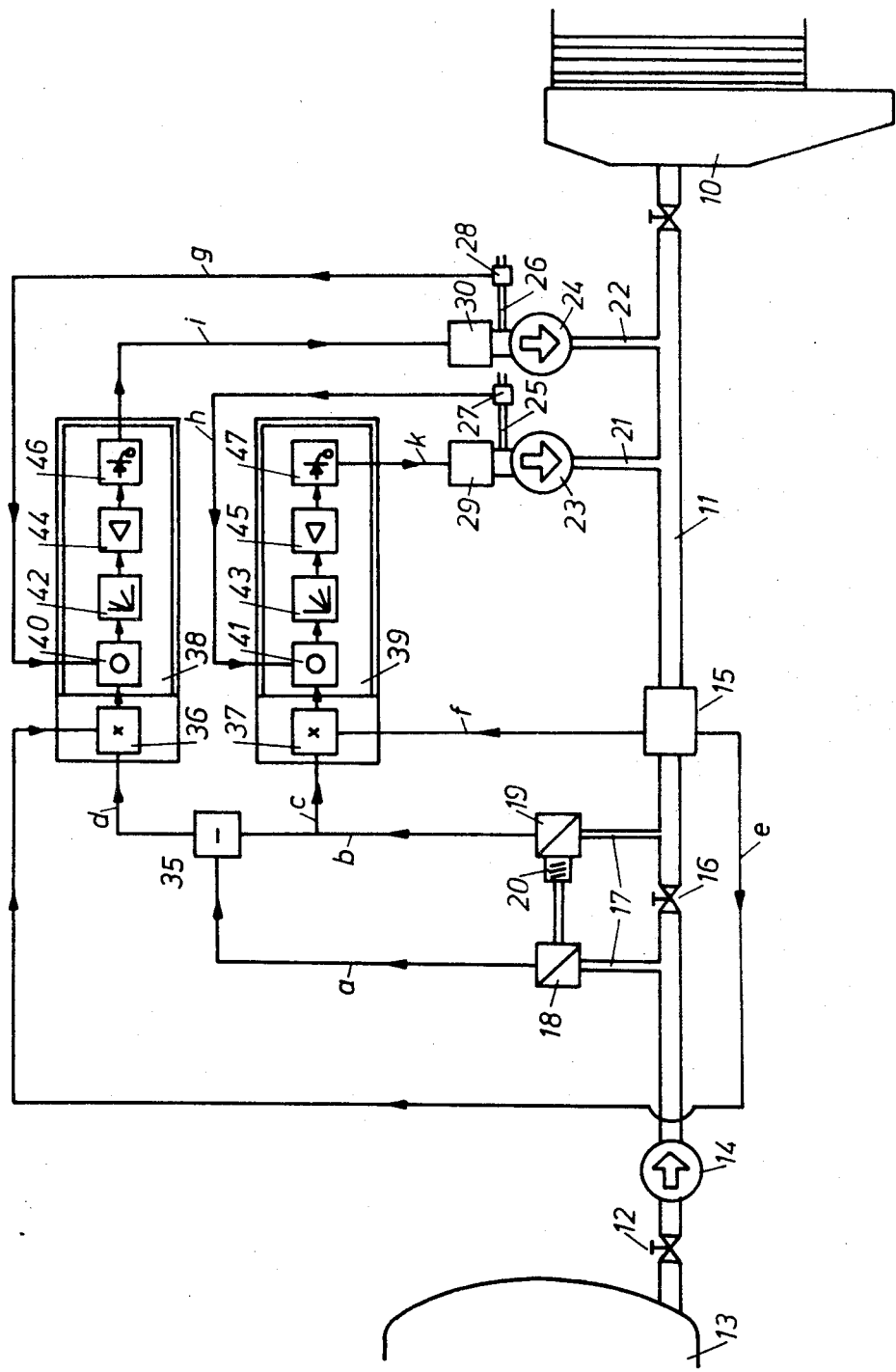

DOSING INSTALLATION

The present invention relates to a dosing installation with a plurality of dosing devices for continuously supplying the respective quantities of auxiliary filtering substances for the cooling and yeast sediments of the liquid which substances are to be supplied during the settling filtration of an albumen containing liquid, especially beer, while the dosing devices are connected to a conduit conveying the liquid to a settling filter, the dosing elements of the dosing devices being adapted to be controlled.

In connection with the settling filtration of albumen containing liquids, especially beer, it is desired to employ for the cooling sediment consisting of free albumen and also for the yest sediment resulting from the yeast content auxiliary filtering substances for the continuous dosing which substances differ from each other and are as to their properties and composition selected in conformity with the respective sediment in the liquid. To this end it is known to mix the corresponding auxiliary filtering substances, for instance different diatomaceous earths, at a certain ratio which is based mostly on empirical values or on a once ascertained degree of cloudiness, and of this mixture to introduce each time dosed quantities in a continuous manner by means of the dosing devices into the cloudy liquid conveying conduit which leads to the settling filter. For changing the dosed quantities dispensed by the dosing devices, the just described dosing installations are provided with a control device operable to act upon the dosing elements of the devices. The control device is dependent on a gauge for measuring the cloudiness of the liquid, the gauge being inserted into the conduit conveying the cloudy liquid. The control device is adapted, in response to a deviation from a certain degree of cloudiness which is set for the dispensing of a predetermined quantity of auxiliary filtering substances, to cause the dosing elements to dispense a quantity of auxiliary filtering substance which is selected in conformity with the respective actual degree of cloudiness. This mode of dosing the auxiliary filtering substances customary with the above described dosing installations, allows the adaptation of the quantity to be dosed out of the mixture of auxiliary filtering substances to the respective degree of cloudiness of the liquid. However it is not possible to obtain a precise dosing, which would correspond to the respective proportion of the yeast sediment and of the cooling sediment, of the auxiliary filtering substances for filtering the respective sediment. Such a dosing is desired, above all, for beer for which the albumen values differ according to the respective brand of beer and from tank to tank.

It is, therefore, an object of the present invention to improve the above described dosing installations and to design the same in such a way that the quantities of the auxiliary filtering substances as they are respectively required for the cooling sediment and the yeast sediment are separately and continuously added in dosed quantities.

This object and other objects and advantages of the invention will appear more clearly from the following specification in connection with the accompanying drawing diagrammatically illustrating an embodiment of the invention in connection with a settling filter of the customary press construction.

The dosing installation according to the present invention is characterized primarily in that for dispensing an auxiliary filtering substance for the cooling sediment as well as for the yeast sediment there is provided one dosing device each equipped with a flow meter while both devices which are directly connected to the cloudy liquid conveying conduit are preceded by a flow meter and a device for measuring the total cloudiness of the liquid and by a measuring device provided with a heating zone for measuring the yeast sediment in the cloudy liquid conveying conduit. The dosing installation according to the invention is furthermore characterized in that the control device comprises a function generator which is equipped substantially with a subtraction stage, two multiplication stages, and two rated-actual value comparison stages. Both cloudiness measuring devices are connected to the subtraction stage. The flow meter inserted into the liquid conveying conduit is connected to the multiplication stage which in its turn is connected to the subtraction stage. The flow meters associated with the dosing devices are respectively connected to the rated-actual value comparison stages which are respectively connected to a multiplication stage.

In view of the inventive feature, namely by separately ascertaining the yeast sediment and the albumen sediment, to determine the respectively required quantities of auxiliary filtering substances for the cooling sediment and the yeast sediment, it will be assured that always only such quantities of auxiliary filtering substances are added to the liquid which correspond to the ascertained quantities of the cooling and yeast sediment so that an overdosing will be avoided which would reduce the filtering time proper and would increase the consumption of auxiliary filtering substances. Moreover, due to the precise adaptation of the quantities of the auxiliary filtering substances to the respective proportion of the albumen and the yeast sediments, the biological success of the sediment filtration is considerably improved. This applies in particular to the filtration of beer because the unfavorable influence of the albumen upon the filtration process is eliminated by the precise dosing of an auxiliary substance which counteracts the albumen.

According to a further development of the invention, the gauge for measuring the total degree of cloudiness and the gauge provided with the heating zone for measuring the yeast sediment content are preferably arranged in a bypass which is branched off ahead of the flow meter from the conduit conveying the cloudy liquid. According to a further feature of the invention, the distance of the two gauges from the admixing area of the dosing devices corresponds to the product of a constant flow velocity and the maximum adjusting time of the dosing devices.

Referring now to the drawing in detail, the filter 10 shown therein is at its inlet side by means of a sediment conduit connected to a larger sediment barrel 13, for instance, a storage tank or a plurality of large containers interconnected by hoses. The barrel 13 is equipped with a shut-off device or valve 12. Behind the shut-off device 12 in the direction toward the filter 10, a delivery pump 14 and an inductive flow meter 15 are arranged in the sediment conduit 11. The flow meter 15 is preceded by a choke or throttling device 16. Within the region of the throttling device 16, the sediment conduit 11 comprises a bypass conduit 17 bridging the throttling device 16. Arranged in the bypass conduit 17 is a sediment gauge 18 for the total sediment content and a sediment gauge 19 for the yeast sediment content. Gauge 18 consists primarily of a selenium or photoelectric cell. Gauge 19 is preceded by a heating zone 20 which brings about a temporary de-coagulation of the albumen.

Directly ahead of the filter inlet there are provided the dosing devices which are represented by the two pumps 23 and 24 and are respectively through a pressure pump conduit 21 and 22 connected to the sediment conduit 11. The suction lines 25 and 26 of pumps 23 and 24 lead to the non-illustrated storage containers for storing the different auxiliary filtering substances which as to their respective properties and compositions are selected in conformity with the cooling sediment consisting primarily of albumen and in conformity with the yeast sediment. Inserted into each pump suction line 25, 26 is furthermore an inductive flow meter 27, 28 respectively. Moreover, the pumps 23, 24 of the dosing devices are respectively equipped with a direct current shunt-wound motor 29, 30. With the arrangement illustrated in the drawing, it has furthermore been taken into consideration that the sediment gauges 18 and 19 are sufficiently spaced from the connections of the pump pressure conduits 21, 22 in the bypass 17 of the sediment conduit 11. In this connection the spacing or distance expediently corresponds to the product of a constant flow velocity of the cloudy liquid and of the maximum adjusting time of the dosing pumps 23, 24 and motors 29, 30 which together form the dosing devices.

The control device itself comprises a function generator known per se with a subtraction stage 35, two multiplication stages 36 and 37, and two rated-actual value comparison stages 38, 39. Connected to the subtraction stage 35 are the sediment meters or gauges 18, 19 with the conduits a, b. Moreover, the sediment gauge 19 is adapted through conduit c to communicate with the multiplication stage 37. The subtraction stage 35 in its turn is through conduit d connected to the multiplication stage 36. The flow meter 15 is with one conduit e, f each connected to the multiplication stages 36, 37. With this arrangement, the subtraction stage 35 ascertains the cooling sediment values as they are obtained from the difference between the total sediment value and the yeast sediment value. The multiplication stages 36 and 37 in their turn ascertain the product signals from the measured values of the meters 18 and 19 and the flow meter 15 as rated value-guiding value factor.

The stages 38, 39 serve for controlling the pump motors 29, 30 and in their turn comprise a bridge circuit 40, 41 each for respectively ascertaining a differential signal resulting from the rated value-actual value comparison, and furthermore comprises an adjusting element 42, 43 for changing the rated value-actual value ratio, still further comprises an amplifier 44, 45 for the differential signal, and finally comprises a phase control (Phasenanschnittssteuerung) 46, 47 with thyristor circuit for a continuous speed adjustment of the pump motors 29, 30. To this end, the flow meters 27 and 28 inserted in the pump conduits 25 and 26 are respectively connected by means of conduits g and h, to a bridge circuit 40, 41 respectively, and the pump motors 29 and 30 are by means of conduits i and k respectively connected to the control 46, 47. Of the cloudy liquid, which during the filtration process is conveyed to the filter 10 through conduit 11, which cloudy liquid by means of the throttling device 16 is adjusted for a constant flow velocity of, for instance, 1 m/sec, is in bypass line 17 continuously ascertained the total of the sediment contents by the gauge 18, and the yeast sediment content is continuously ascertained by the gauge 19. The ascertaining of the yeast sediment content is effected by warming up the liquid within the region of zone 20 in the course of which the albumen in the sediment de-coagulates so that gauge 19 is able to measure the yeast sediment component. The values ascertained by the gauges 18 and 19 are conveyed to the stages 35, 36 and 37. The stage 35 will from the difference between the total sediment content and the yeast sediment content ascertain the respective prevailing cooling sediment content which in the form of a measured value is conveyed to the stage 36. The yeast sediment value measured by the gauge 18 is simultaneously conveyed to the multiplication stage 37. In the stages 36 and 37 the introduced sediment values are multiplied by the throughflow quantity ascertained by the flow meter 15 in the conduit 11, and the result ascertained as rated value-guiding value factor is compared in the bridge cicuit 40, 41 with the respective ascertained actual values of the added dosage quantities, the actual values being measured by the flow meters 27 and 28 respectively. If with one or both pumps 23, 24 the actual value differs from the rated value, it will be appreciated that in view of the different voltage ratios a differential signal will be obtained which after its passage through the amplifiers 44, 45 automatically through the intervention of the control 46, 47 adjusts the speed of the pump motors 29, 24 until a voltage equalization is obtained which means the rated value and the actual value are equal. In this way each dosing device will automatically pump into conduit 11 the proper quantities of the auxiliary filtering substances in conformity with the continuously ascertained cooling and yeast sediment contents.

It is, of course, to be understood that the present invention is by no means limited to the particular showing in the drawing but also comprises any modifications within the scope of the appended claims.

What I claim is:

1. A dosing system for continuously dosing and dispensing the respective quantities of auxiliary filtering substances to be added in connection with a settling filtration to a cloudy liquid, especially beer, for the cooling and yeast sediments, which in-cludes: first and second dosing means for respectively dosing different auxiliary filtering substances for the cooling sediments and the yeast sediments, first and second flow meters respectively associated with said first and second dosing means, sediment con-duit means adapted to be connected to a settling filter, first and second conduit means being connected to said sediment conduit means, a third flow meter and a cloudiness gauge for the respective total sediment and a cloudiness gauge for the respective yeast sediment, said last mentioned gauge including a heating zone, said third flow meter and said gauges being in direct communication with said sediment conduit means and preceding the connection of said first and second dosing means with said second conduit means when looking in the direction of flow in said sediment conduit means, and control means associated with said gauges and said third flow meter and also with said dosing means, said control means including a function generator comprising a subtraction stage and two multiplication stages, one of said multiplication stages being connected to said subtraction stage and also including two rated value - actual value comparing stages respectively connected to said two multiplication stages, said two gauges being connected to said subtraction stage and said third flow meter being connected to said multiplication stages while said first and second flow meters are respectively connected to said rated value - actual value comparing stages.

2. A dosing system according to claim 1, which includes throttling means arranged within said sediment conduit means and preceding said third flow meter when looking in the direction of flow in said sediment conduit means, and by-pass means by-passing said throttling means and having said gauges arranged therein.

3. A dosing system according to claim 1, in which the cloudiness gauge for the total sediment and the cloudiness gauge for the yeast settlement are spaced from the areas of connection of said first and second dosing means with said sediment conduit means by a distance approximately equalling the product of the velocity of the cloudy liquid set for constant flow speed and the maximum adjusting time for said first and second dosing means.

* * * * *